US011936480B2

(12) United States Patent
Shabdanov et al.

(10) Patent No.: US 11,936,480 B2
(45) Date of Patent: Mar. 19, 2024

(54) APPARATUS AND METHODS FOR HARQ IN A WIRELESS NETWORK

(71) Applicant: MediaTek Singapore Pte. Ltd., Singapore (SG)

(72) Inventors: Samat Shabdanov, San Jose, CA (US); Po-Yuen Cheng, San Jose, CA (US); Chung-Ta Ku, San Jose, CA (US); Weisung Tsao, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 281 days.

(21) Appl. No.: 17/075,652

(22) Filed: Oct. 20, 2020

(65) Prior Publication Data

US 2021/0126743 A1 Apr. 29, 2021

Related U.S. Application Data

(60) Provisional application No. 62/924,812, filed on Oct. 23, 2019.

(51) Int. Cl.
*H04L 1/1812* (2023.01)
*H04L 1/00* (2006.01)
*H04W 84/12* (2009.01)

(52) U.S. Cl.
CPC .......... *H04L 1/1812* (2013.01); *H04L 1/0057* (2013.01); *H04W 84/12* (2013.01)

(58) Field of Classification Search
CPC ..... H04L 1/1812; H04L 1/0057; H04W 84/12
See application file for complete search history.

(56) References Cited

U.S. PATENT DOCUMENTS

| 2008/0107053 A1* | 5/2008 | Kim | H04L 1/1812 370/310 |
| 2008/0301517 A1* | 12/2008 | Zhong | H03M 13/1102 714/752 |
| 2009/0086638 A1* | 4/2009 | Niu | H04L 1/0084 370/238 |
| 2015/0049677 A1* | 2/2015 | Lin | H04L 1/0057 370/329 |

(Continued)

FOREIGN PATENT DOCUMENTS

| CN | 1496051 A | 5/2004 |
| TW | 202011710 A | 3/2020 |
| WO | WO-2020224765 A1 * | 11/2020 ............... H04L 1/08 |

*Primary Examiner* — Brian P Cox

(57) ABSTRACT

Methods and apparatus for enabling data transmission using HARQ in IEEE 802.11 systems are described. A method is disclosed, performed by a transmitting device, comprising computing a plurality of redundancy frames based on a plurality of data frames, transmitting the plurality of data frames to a receiving device, and transmitting a set of the plurality of redundancy frames to the receiving device determined by the transmitting device in response to receiving acknowledgement. One embodiment includes a method determining failed data frames of the plurality of data frames, requesting a set of the plurality of redundancy frames, and recovering the failed data frame using a decoder employing hard decision inputs. Other embodiments include an apparatus in a receiver device implementing the method of decoding the failed data frames using a decoder employing soft decision inputs.

17 Claims, 18 Drawing Sheets

(56) References Cited

U.S. PATENT DOCUMENTS

| | | | |
|---|---|---|---|
| 2016/0127020 A1* | 5/2016 | Abraham | H04B 7/0452 |
| | | | 370/312 |
| 2016/0365952 A1* | 12/2016 | Kim | H04L 1/1816 |
| 2017/0093528 A1 | 3/2017 | Oveis Gharan et al. | |
| 2017/0230149 A1* | 8/2017 | Wang | H04L 1/1614 |
| 2019/0181977 A1 | 6/2019 | Roberts et al. | |
| 2020/0366409 A1* | 11/2020 | Xu | H04L 1/0061 |

* cited by examiner

APPARATUS AND METHODS FOR HARQ IN A WIRELESS NETWORK

CROSS-REFERENCE TO RELATED APPLICATIONS

This application claims the benefit of and priority to provisional patent application Ser. No. 62/924,812, with filing date Oct. 23, 2019, which is hereby incorporated by reference in its entirety.

FIELD

Embodiments of the present invention generally relate to the field of wireless communications. More specifically, embodiments of the present invention relate to systems and methods for data transmission using Hybrid Automatic Repeat Request (HARQ) in wireless networks.

BACKGROUND

Modern electronic devices typically send and receive data with other electronic devices wirelessly (e.g., using Wi-Fi), and often data may be lost or corrupted. This can be due to interference from other electronic devices or other common issues with wireless transmission of data. For these reasons, several techniques for reliable transmission have been developed so that transmitted data intended for the receiver can be delivered successfully, even if retransmission is required.

The two common techniques for reliable data transmission are Automatic Repeat Request (ARQ) and Forward Error Coding (FEC). ARQ is a technique that requires the receiver to send an acknowledgement packet when data has been received successfully. If the data is not delivered successfully no acknowledgment is sent to the transmitter. In this case, when the transmitter does not receive an acknowledgment, the data is retransmitted. However, the bandwidth efficiency of ARQ is relatively low, and the receiver fails to exploit potential spectral improvement using partially decoded data as any unsuccessfully received data frame is discarded by the receiver. FEC is a technique that uses error correcting codes to encode an original data message by including redundancy (parities). The use of FEC improves the transmission reliability as the receiver can correct a certain amount of errors without the need for data to be retransmitted.

Hybrid automatic repeat request (hybrid ARQ or HARQ) is a scheme that combines forward error-correcting coding with ARQ. With HARQ, incorrectly decoded data frames are not discarded, but are stored to be later combined, before decoding, with retransmitted data frames by the receiver. HARQ can perform better than ARQ in poor channel conditions and can perform worse than ARQ due to added redundancy when the channel conditions are relatively good. In practice, the two most common HARQ combining techniques are Chase Combining (CC) and Incremental Redundancy (IR). HARQ combined with CC enhances decoding by combining past and current transmissions, whereas IR is performed by sending additional parities in portions in order to control the coding rate.

Currently under the IEEE 802.11ax standard, the Physical (PHY) layer uses low-density parity-check (LDPC) code for FEC while the Medium Access Control (MAC) layer uses Block ACK (BACK) for ARQ. That is it, in 802.11, ARQ and FEC are not combined and are used independently at different protocol layers. Introducing HARQ under the IEEE 802.11 standards presents a number of challenges. For example, if HARQ is employed only in the MAC protocol using MAC protocol data units (MPDU) or Aggregate MPDUs (A-MPDU), then on retransmission requests, each retransmission can carry different codewords (or encoded data) because the retransmitted codewords may be generated by the PHY using different MPDU payloads and headers (e.g., a different number of delimiters, different CRC/FCS bits, and/or different MAC headers). As a result, the receiver may not be able to combine current and past codewords for decoding purposes. Moreover, an MPDU or A-MPDU may span across multiple complete and partial codewords. This results in a codeword mismatch that also prevents combining retransmitted codewords at the receiver. On the other hand, if HARQ is employed only at the LDPC codeword level, then existing 802.11 PHY layer may not be able to perform detection and request retransmission of erroneous LDPC codewords because the PHY layer defined according to the current IEEE 802.11 standard is not enabled with capabilities to support a codeword-based ARQ mechanism.

SUMMARY

Accordingly, what is needed is an approach to HARQ that conforms to emerging IEEE 802.11 standards (e.g., IEEE 802.11be and beyond) by adapting the existing PHY and MAC layer protocols.

Embodiments of the present invention disclosed herein provide an apparatus and methods for performing HARQ functionalities in accordance with the 802.11 standards (e.g., 802.11be) including minimal changes to the PHY layer and MAC layer. An FEC Frame-based (FECF) encoder is used to generate parity (aka redundancy) frames from data frames at the sender. These parity frames are transmitted by the sender in response to ARQ requests sent by the receiver. The sender can use the parity frames to recover lost data frames using an FECF decoder According to some embodiments, a HARQ-hard scheme using an FECF hard input decoder employed entirely at the MAC layer is described. According to other embodiments, a HARQ-soft scheme using an FECF soft input decoder employed at the PHY layer is described. The sender may also compensate for packet losses in the wireless channel by transmitting a certain amount of parity frames opportunistically.

According to one embodiment, a method of wirelessly transmitting information performed by a transmitting device is disclosed. The method includes computing a plurality of redundancy frames based on a plurality of data frames, where the plurality of data frames include data bits, transmitting the plurality of data frames to a receiving device, receiving an acknowledgement, from the receiving device, that one or more of the plurality of data frames are missing at the receiving device, and transmitting a set of the plurality of redundancy frames to the receiving device in response to receiving the acknowledgement, where the transmitting device and the receiving device communicate in accordance with a version of the IEEE 802.11 standard.

According to some embodiments, subsequent to the transmitting a set of the plurality of redundancy frames, receiving another acknowledgement, from the receiving device, that one or more of the plurality of data frames are missing at the receiving device, and transmitting another set of the plurality of redundancy frames to the receiving device in response to receiving the another acknowledgement, where the set and the another set include different redundancy frames of the plurality of redundancy frames.

According to some embodiments, the method includes storing the plurality of redundancy frames in a buffer memory of the transmitting device.

According to some embodiments, the method includes opportunistically transmitting redundancy frames of the plurality of redundancy frames to the receiving device before the receiving the acknowledgement.

According to some embodiments, the plurality of redundancy frames are operable to provide information to the receiving device to reconstruct missing data frames of the plurality of data frames.

According to some embodiments, each redundancy frame of the plurality of redundancy frames includes a header that includes an indication that each redundancy frame is a redundancy frame, and a sequence number to identify a group of data frames to which each redundancy frame pertains.

According to another embodiment, a method of decoding information of a wireless transmission performed by a receiving device is disclosed. The method includes receiving data frames of a plurality of data frames including data bits from a transmitting device, examining the data frames to determine failed data frames of the plurality of data frames, transmitting a request to the transmitting device to send redundancy frames associated with the plurality of data frames, receiving the redundancy frames from the transmitting device, and decoding failed data frames using the data frames of the plurality of data frames and the redundancy frames, where the transmitting device and the receiving device communicate in accordance with a version of the IEEE 802.11 standard.

According to some embodiments, each redundancy frame of the redundancy frames includes a respective header that includes an indication that each redundancy frame is a redundancy frame, and a sequence number to identify a group of data frames to which each redundancy frame pertains.

According to some embodiments, the method includes determining that a number of successfully decoded data frames of the plurality of data frames plus a number of successfully decoded redundancy frames of the plurality of redundancy frames is less than a predetermined value before the transmitting the request to the transmitting device to send redundancy frames.

According to some embodiments, examining the data frames to determine failed data frames of the plurality of data frames is performed using a decoder operable for decoding LDPC codes and employing soft decision input and hard decision output.

According to some embodiments, the method includes determining failed data frames of the plurality of data frames, transmitting a request for additional redundancy frames, receiving the additional redundancy frames from the transmitter, and decoding failed data frames using the received data frames of the plurality of data frames and the received redundancy frames of the plurality of redundancy frames.

According to a different embodiment, an apparatus within a receiving device for decoding information of a wireless transmission from a transmitting device is disclosed. The apparatus includes a controller coupled to a buffer memory and operable to receive log-likelihood ratios (LLRs) of received data frames and LLRs of received redundancy frames and to store LLRs in the buffer memory, an 802.11 decoder operable to decode codewords of the received data frames and pass decoded bits of the codewords to an 802.11 MAC interface, where the 802.11 decoder is coupled to the controller, an 802.11 MAC interface coupled to the controller and the 802.11 decoder, where the 802.11 MAC interface is operable to provide an indication to the controller identifying failed data frames of the received data frames, and a redundancy decoder coupled to the controller and the 802.11 MAC interface and operable to receive instructions from the controller to decode bits of the failed data frames using LLRs stored in the buffer memory.

According to some embodiments, the receiving device is operable to request additional redundancy frames based on the indication identifying failed data frames of the received data frames, and where the redundancy decoder is operable to decode bits of the failed data frames using LLRs stored in the buffer memory in combination with LLRs of last received redundancy frames.

According to some embodiment, the 802.11 decoder and the redundancy decoder reside at the physical layer of the receiving device.

According to some embodiment, the controller is further operable to clear the buffer memory when all bits of the failed data frames are decoded successfully as indicated by the 802.11 MAC interface.

According to some embodiment, the receiving device communicates with a transmitting device in accordance with a version of the IEEE 802.11 standard.

According to some embodiment, the apparatus includes a demodulator coupled to the controller and the 802.11 decoder, where the demodulator is operable to pass the LLRs of received frames to the controller and to pass a demodulated signal to the 802.11 decoder for decoding the received data frames.

According to some embodiment, the 802.11 MAC interface is operable to receive the decoded bits of the codewords from the 802.11 decoder and further operable to discard decoded bits of a redundancy frame and further operable to store decoded bits of a data frame.

According to some embodiment, the redundancy decoder is operable to utilize a same redundancy-check matrix for decoding as used by a redundancy encoder of the transmitting device and where further the matrix is identified to the receiving device based on MAC protocolling.

According to some embodiment, the redundancy decoder outputs only decoded bits of failed data frames to the 802.11 MAC interface for failed data frame identification.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
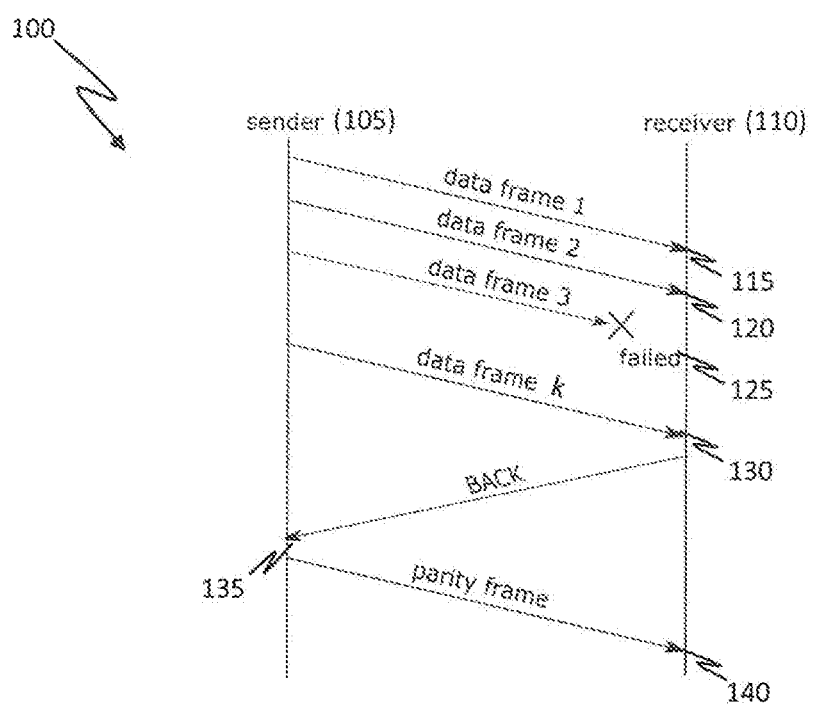
FIG. 1 is a block diagram illustrating an exemplary frame exchange sequence using novel HARQ schemes.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 3A, 3B, 9A, and 9B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel HARQ Schemes for IEEE 802.11

Embodiments of the present invention disclosed herein provide an apparatus and methods for performing HARQ functionalities in accordance with the 802.11 standards (e.g., 802.11be) including minimal changes to the PHY layer and MAC layer. An FEC Frame-based (FECF) encoder is used to generate parity (aka redundancy) frames from data frames at the sender. These parity frames are transmitted by the sender in response to ARQ requests sent by the receiver. The sender can use the parity frames to recover lost data frames using an FECF decoder According to some embodiments, a HARQ-hard scheme using an FECF hard input decoder employed entirely at the MAC layer is described. According to other embodiments, a HARQ-soft scheme using an FECF soft input decoder employed at the PHY layer is described. The sender may also compensate for packet losses in the wireless channel by transmitting a certain amount of parity frames opportunistically.

FIG. 1 depicts an exemplary HARQ protocol sequence 100 including original data frames 115, 120, 125, 130 along with a block acknowledgement (BACK) 135 and parity frame 140 according to embodiments of the present invention. In sequence 100, it is assumed that parity frames (e.g., a parity frame 140) are generated by the sender 105 from k data frames using a code generator matrix. Firstly, a sender transmits data frames. A data frame 1 (115) is transmitted by the sender 105 (a "transmitting device") to a receiver 110 (a "receiving device"). As used herein, the term station (STA) refers generally to an electronic device capable of sending and receiving data over Wi-Fi that is not operating as an Access Point (AP). The sender 105 and receiver 110 can include a wireless STA or AP. The sender receives data frame 1 (115) and data frame 2 (120) successfully (without error). Data frame 3 (125) is not received successfully by receiver 110. After all the k data frames 115, 120, 125, and 130 are transmitted by sender 105, the receiver 110 transmits a BACK indicating which data frames (MPDUs) were or were not received. In this example 100, the BACK is transmitted from receiver 110 to sender 105 indicating that data frame 3 (125) was not decoded successfully.

Based on BACK 135, sender 105 can identify the number of failed data frames. It is assumed that sender 105 determines the amount parity frames to send to receiver 110 using one of any well-known predefined algorithmic rules. In the example of FIG. 1, sender 105 determines that it is sufficient to transmit only one parity frame 140 to receiver 110 so that all bits in data frame 3 can be reconstructed on the receiver side. The group of k data frames and parity frames are considered by the sender (105) and receiver (110) as codewords of a linear block code.

In one embodiment, an FECF encoder at the sender side may use any systematic block code C (n, k, d) that enables the sender to construct r parity frames from k data frames. Table I below shows an exemplary procedure to generate codewords c from a encoding matrix $G_{k \times n}$ with k data frames, where $u_{i,j}$ and $p_{i,j}$ is the i-th symbol of the j-th data and parity frame, respectively. FECF symbols $u_{i,j}$ and $p_{i,j}$ can be defined as either a bit, a sequence of bits, or a modulated symbol.

TABLE I $$c = \begin{bmatrix} u_{1,1} & \cdots & u_{1,k} \\ \vdots & \ddots & \vdots \\ u_{L,1} & \cdots & u_{L,k} \end{bmatrix} \begin{bmatrix} p_{1,(k+1)} & \cdots & p_{1,(n)} \\ \vdots & \ddots & \vdots \\ p_{L,(k+1)} & \cdots & p_{L,(n)} \end{bmatrix} = \begin{bmatrix} u_{1,1} & \cdots & u_{1,K} \\ \vdots & \ddots & \vdots \\ u_{L,1} & \cdots & u_{L,k} \end{bmatrix} \times G,$$

The first k columns of $c=(u_1, \ldots, u_k, p_{k+1}, \ldots, p_n)$ represent the original data frames and the remaining (n−k) columns represent the parity frames. Each data frame has a size of L bits or symbols. While a code C (n, k, d) can be any block code, it is desirable to choose a code C that has optimal or near optimal erasure correcting capabilities.

Figure 2:
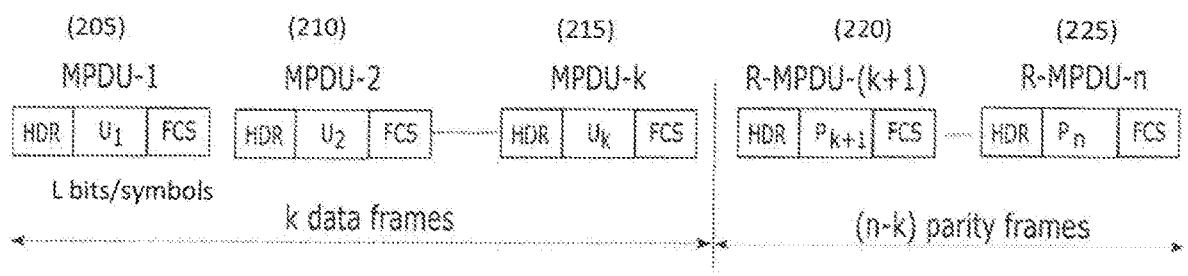
FIG. 2 is a block diagram of an exemplary FECF encoder according to embodiments of the present invention.

With regard to FIG. 2, an exemplary series of data frames (MPDUs) and parity frames (R-MPDUs) are depicted according to embodiments of the present invention. Each parity MPDU is transmitted with a MAC header (HDR) and the frame check sums (FCS) used for error detection. As depicted in FIG. 2, when C(n, k, d) code is used by the FECF encoder, r parity frames (R-MPDUs 220 and 225) can be generated from k data frames (MPDUs 205, 210, 215). This results in forming a FECF Coding Group (FECF CG) of size n frames. The FECF CG is a collection of encoded MPDU frames that belong to the same codewords of a code C(n, k, d). The sender is operable to store r parity frames (e.g., R-MPDUs 220 and 225) in a buffer. The FECF encoder requires that the size of all MSDUs is the same (e.g., L bits). This can be achieved by using zero padding, for example. The sender must include a set of predefined elements or fields in the HDR of parity frames (R-MPDUs) used by the receiver to identify the parity frames.

The receiver may use R-MPDUs 220 and 225 to reconstruct any original data contained in MPDUs 205, 210, and 215 (and any other data frames transmitted) that may not be decoded successfully. For example, in FIG. 2, the R-MPDU parity frames can be used to reconstruct the payload bits of MPDU-2 (i.e., MSDU $U_2$ 210) if MPDU-2 is not decoded successfully at the receiver. According to some embodiments, the MPDUs and R-MPDUs that are used to generate the same codewords are identified by the receiver using an FECF CG number and a frame Sequence Number (FSN) carried in HDRs. Both the FECF CG number and the FSN are parsed in HDRs by the sender according to predefined rules.

Figure 3A:
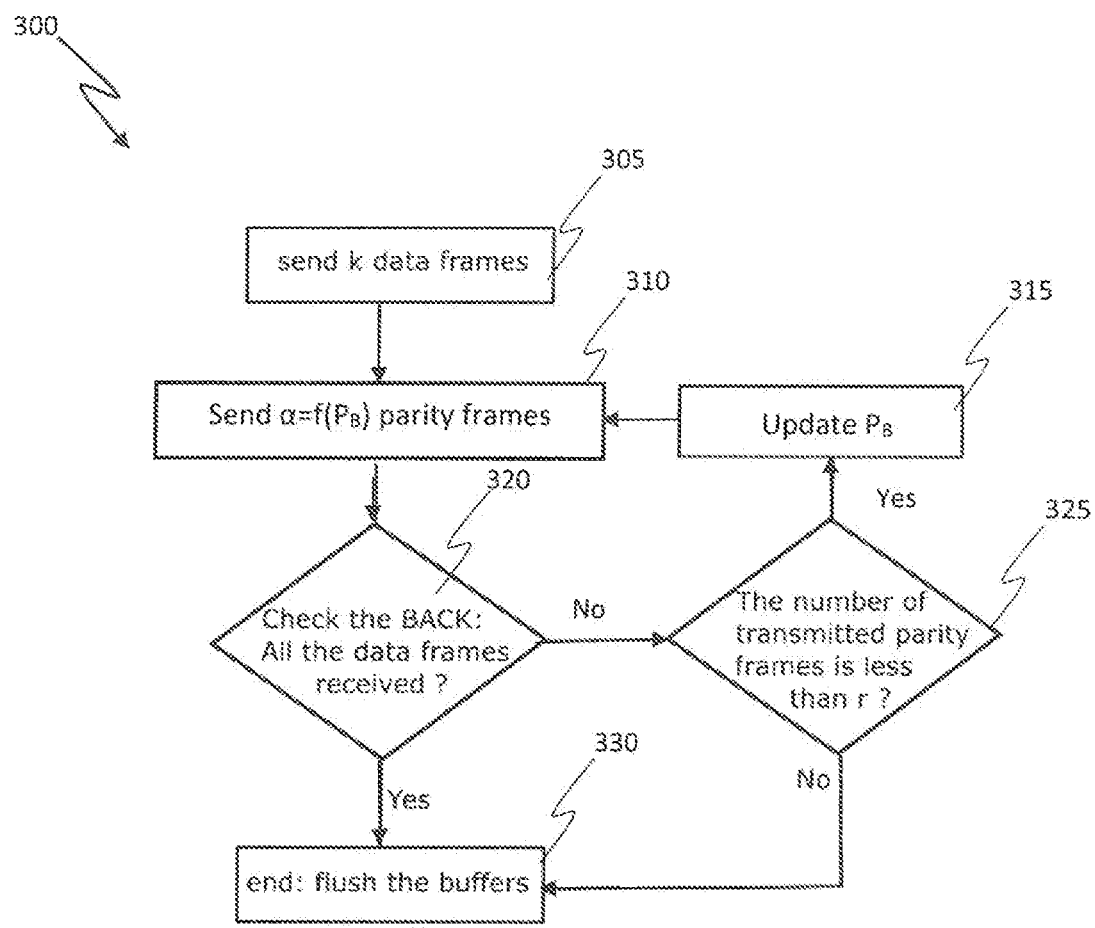
FIG. 3A is a flowchart depicting an exemplary sequence of steps for performing a HARQ transmission.

FIG. 3A is a flowchart depicting an exemplary process 300 for performing FECF-based HARQ encoding at a transmitting device (sender). When C(n, k, d) code is used by the HARQ encoder, the sender can only send up to r parity frames belonging to the same FECF CG.

Specifically, at step 305, the sender transmits k data frames (e.g., k MPDU frames).

At step 310, the sender may also send a parity frames opportunistically following step 305. For example, the sender may determine how many parity frames a to transmit using the bit error rate estimate $P_B$ and some additional function f(•) in order to opportunistically compensate for channel losses and reconstruct lost frames at the receiver. For example, the estimate $P_B$ may be determined by computing an average number of errors in the channel from previously received acknowledgments (e.g., BACKs), or using other well-known methods of error estimation. Transmitting parities opportunistically is a way to predict errors in the channel so that the receiver employing a simpler HARQ like HARQ-hard can manage the amount of redundancy and throughput.

At step 315, the $P_B$ estimate is updated according to recently received BACKs.

At step 320, the sender determines if all of the data frames transmitted have been received successfully according to the BACKs received from the receiver. At step 330, the sender flushes the buffers storing the transmitted frames if all the data frames have been delivered step 320 or if the sender has already transmitted all the parity frames r in step 325. If it is determined that some data frames are lost in step 320, and if the number of transmitted frames belonging to the same FEC CG is less than r step 325, then the sender may update $P_B$ at step 315 according to newly received BACKs and may send a new portion of parity frames $f(P_B)$ step 310. At Step 330, process 300 ends and any buffers used to store the data and parity frames can be flushed.

Figure 3B:
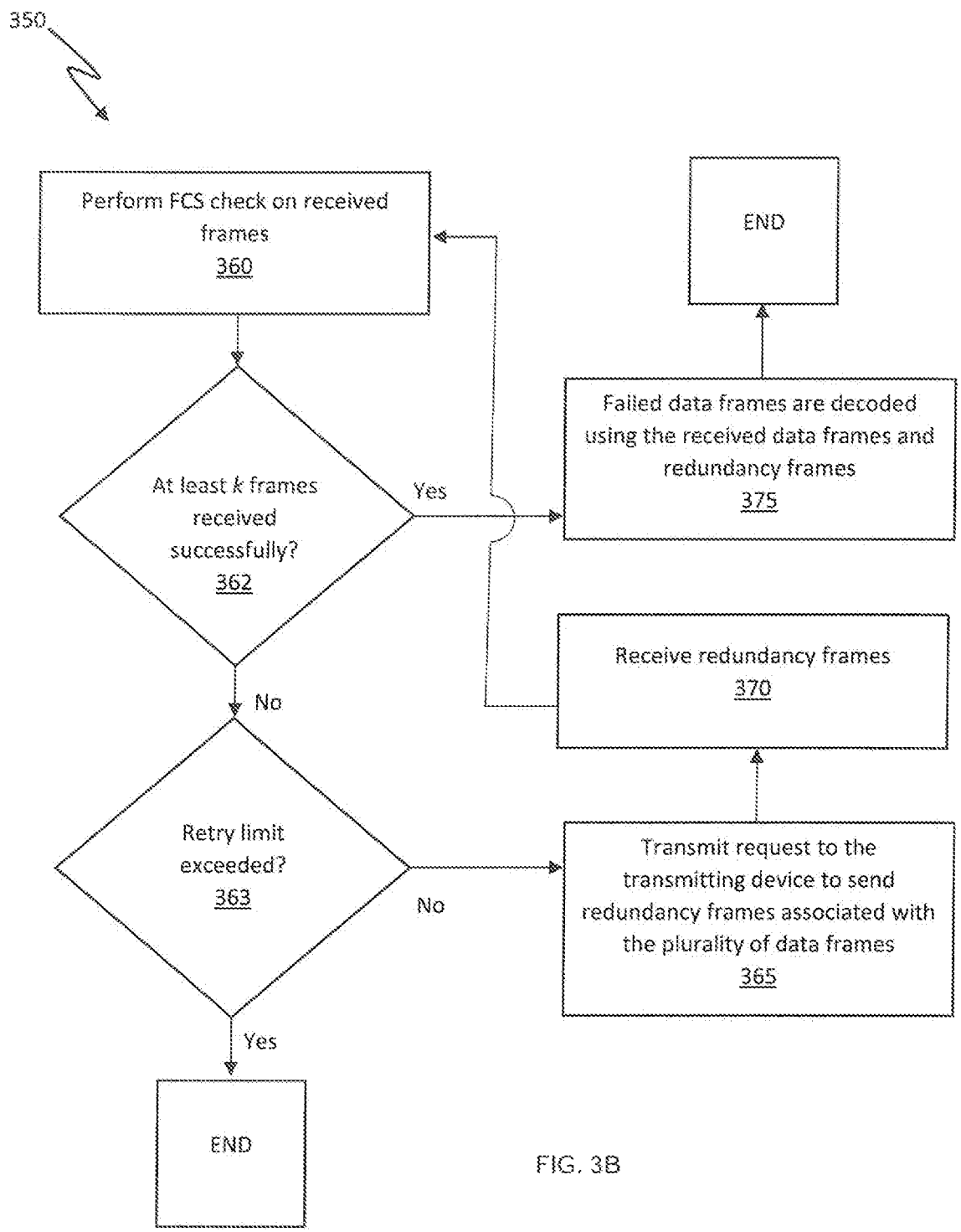
FIG. 3B is a flowchart depicting an exemplary sequence of steps for performing HARQ-hard decoding.

It is appreciated that for decoding, as described above with regard to FIG. 2, the FECF decoder can use only those parity frames that belong to the same encoded data group and the same codeword of a code C(n, k, d). FIG. 3B is a flowchart depicting an exemplary sequence of steps of a process 350 for performing a HARQ-hard decoding according to embodiments of the present invention.

At step 360, the received frames are examined by the receiving device to determine any frames that failed. When the receiving device (receiver) is operable to perform HARQ-hard, an FECF decoder that operates on hard decision inputs is employed at the MAC layer. The receiver can determine the position of frames that have failed using FCS check. When the positions of erroneous frames are known in a FECF CG, the FECF decoder can exploit the erasure capabilities of a code. Step 362 determines if at least k frames are decoded successfully to enable the FECF decoder to recover any failed data frames in the FECF CG of size n frames. Step 363 determines if the MAC has reached the limit on retry requests. If it is determined that the retry limit has been exceeded at step 363, process 350 ends.

At step 365, if it is determined that the retry limit has not been exceeded in step 363, the receiving device transmits a request to the transmitting device to send redundancy frames associated with the plurality of data frames.

At step 370, the redundancy frames are received from the transmitting device. The process 350 continues from step 360 using the redundancy frames received at step 370. According to some embodiments, the redundancy frames include an indication that each redundancy frame is a redundancy frame, and a sequence number to identify a group of data frames to which each redundancy frame pertains.

If it is determined at step 362 that at least k frames are received successfully, at step 375, any failed data frames are decoded using the received data frames and the redundancy frames. Any padded zeroes are removed from the MPDUs after all data frames are decoded successfully. The actual size of a frame can be tracked from the frame's delimiter field. After step 375, process 350 ends.

According to some embodiments, a system model with HARQ-hard uses the following parameters: n=64, L=500 bytes, and $\alpha = n(1-(1-P_B)^L)$ where $P_B$ denotes an estimate on bit error rate. The k data frames are encoded using a Reed-Solomon code that can correct up to r erasures. The number of parity frames a is selected to minimize the packet error rate by compensating for independent frame losses. By adding r parity frames, redundancy is added with a code rate of k/n. The channel is modelled as a fast varying Rayleigh fading channel at 20 MHz with 2 Modulation Coding Schemes (MCS), 4QAM with rate $R_1$=16 mbps and 16QAM with rate R2=33 mbps.

Figure 4:
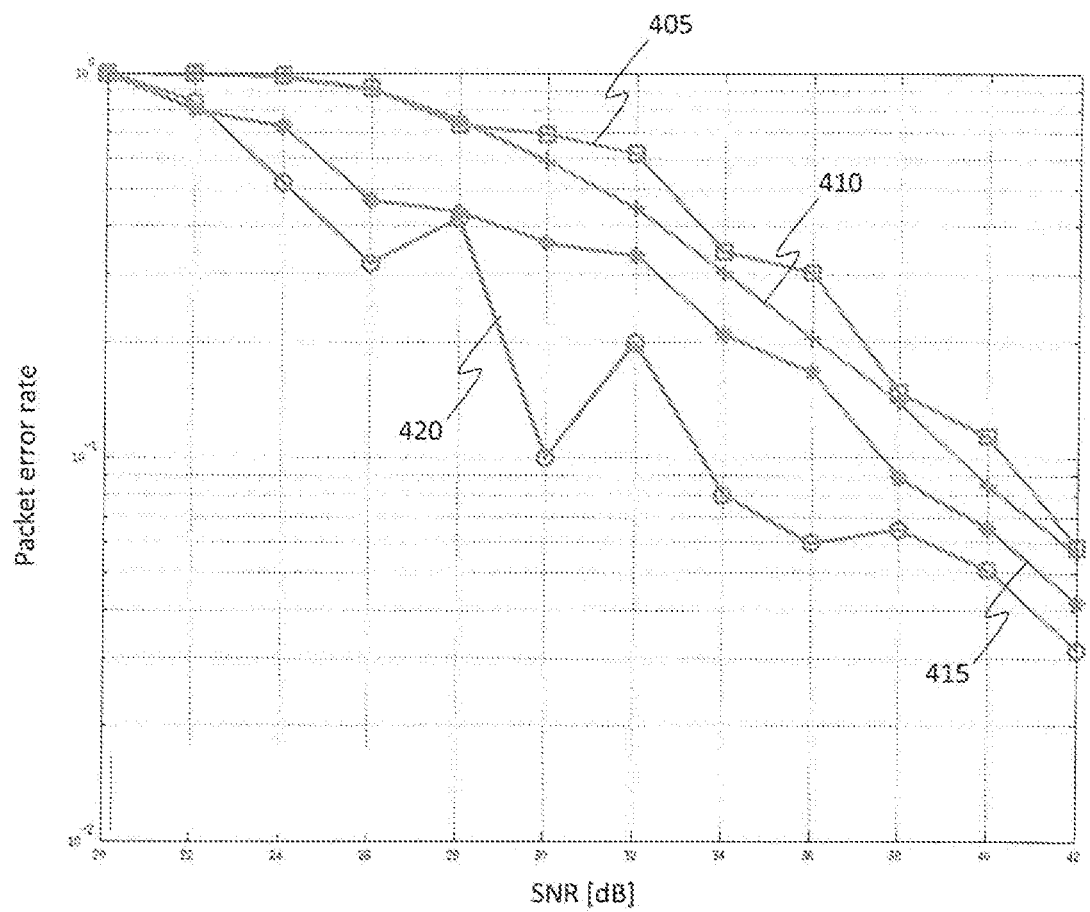
FIG. 4 is a chart depicting the Packet Error Rate (PER) as a function of Signal-to-Noise ratio (SNR) for HARQ-hard using 4 Quadrature Amplitude Modulation (QAM).
Figure 5:
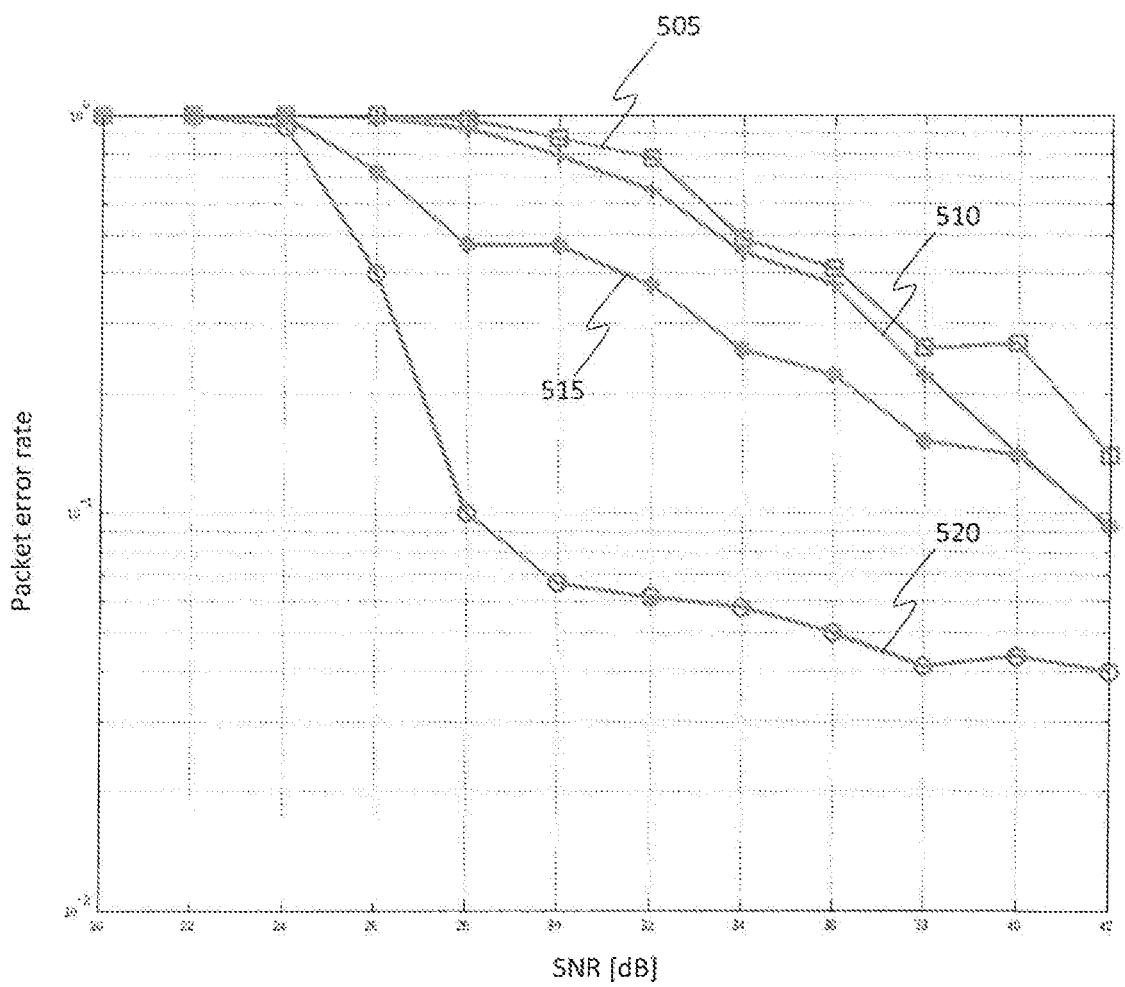
FIG. 5 is a chart depicting the PER as a function of SNR for HARQ-hard using 16QAM.

FIG. 4 and FIG. 5 show the PER vs SNRs for HARQ-hard using 4QAM and 16QAM, respectively. It is appreciated that using HARQ-hard significantly improves the average PER over the entire transmission power range for both cases using 4QAM and 16QAM. Specifically, the coding gain achieved can be up to 14 dB for 16QAM shown in FIG. 4, and up to 4 dB for 4QAM. In FIG. 4 and FIG. 5, curves 405 and 505 represent non-HARQ theoretical, curve 410 and 510 represent non-HARQ simulated, curves 415 and 515 represent HARQ-hard theoretical, and curve 420 and 520 represent HARQ-hard simulated.

Figure 6:
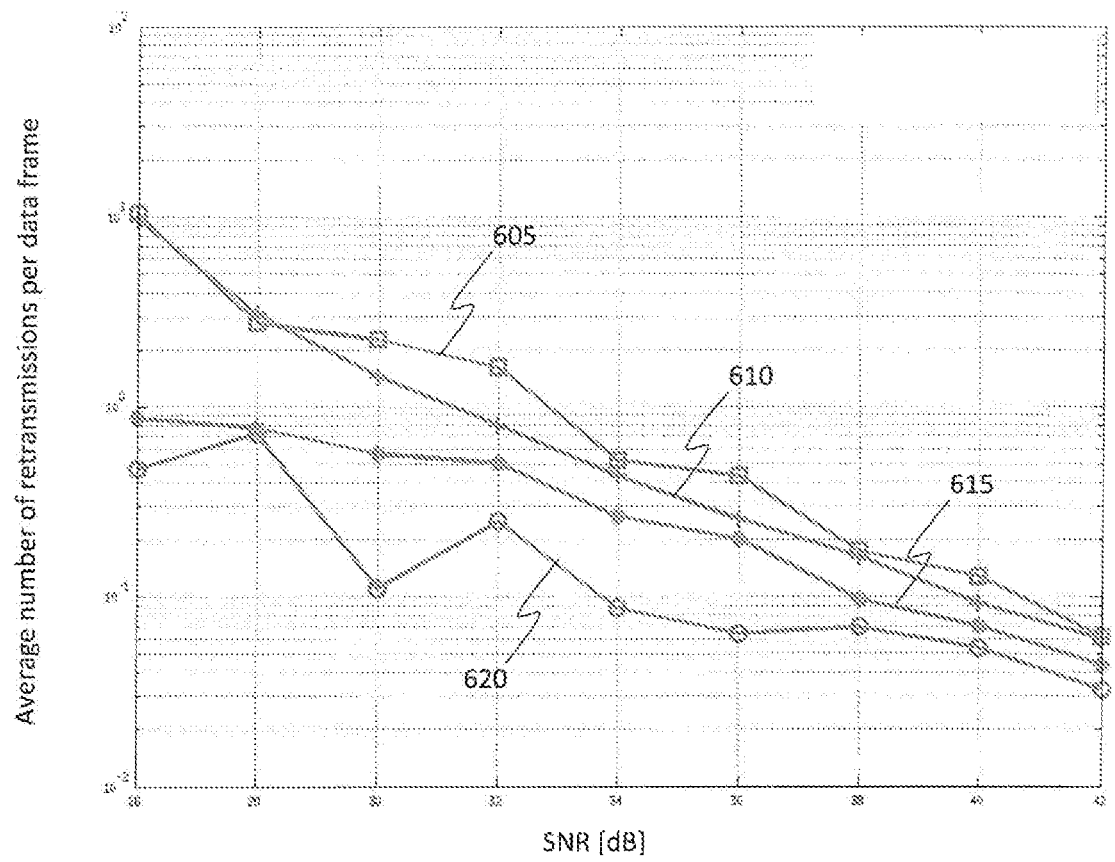
FIG. 6 is a chart depicting the average number of transmissions per data frame as a function of SNR for HARQ-hard using with 4QAM.
Figure 7:
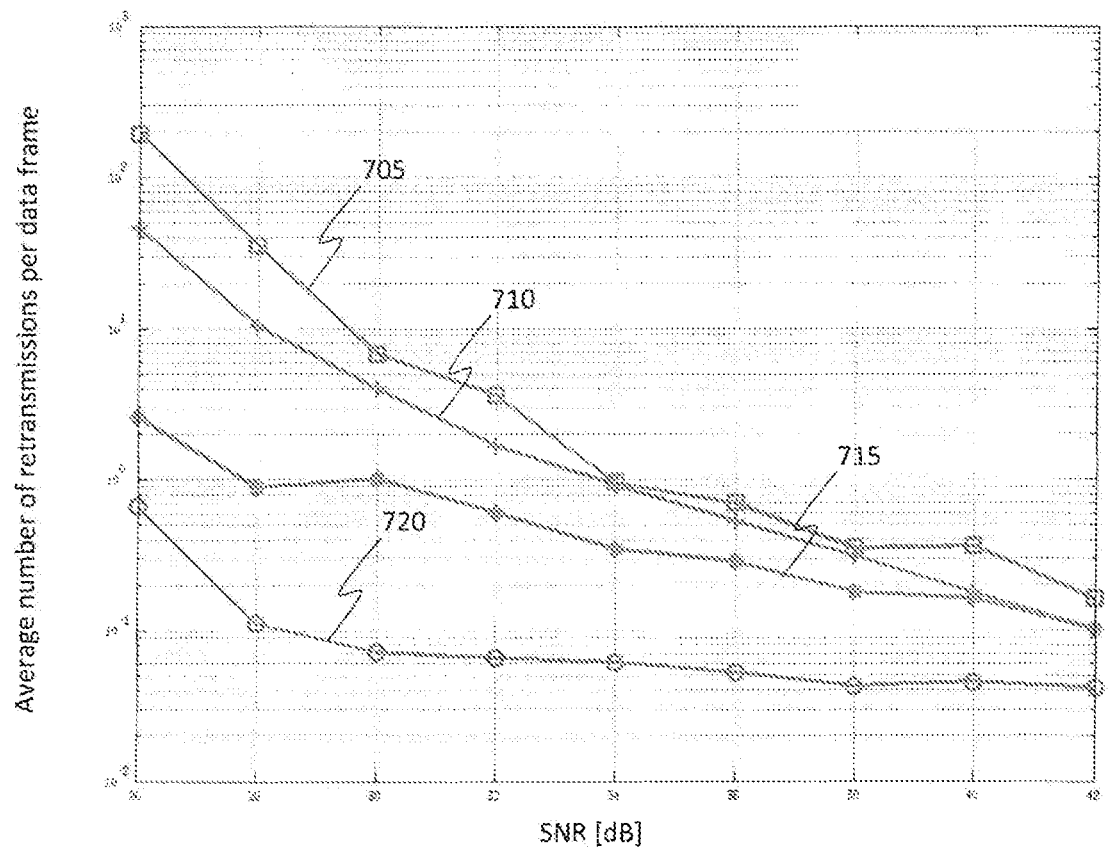
FIG. 7 is a chart depicting the average number of transmissions per data frame as a function of SNR for HARQ-hard using with 16QAM.

FIG. 6 and FIG. 7 depict the average number of transmissions per data frame for different SNRs for HARQ-hard using 4QAM and 16QAM, respectively. Notably, HARQ-hard advantageously lowers the PER which consequently yields a lower number of retransmissions. As a result, this improves the end-to-end delay (latency). In FIG. 6 and FIG. 7, curves 605 and 705 represent non-HARQ theoretical, curves 610 and 710 represent non-HARQ simulated, curves 615 and 715 represent HARQ-hard theoretical, and curves 620 and 720 represents HARQ-hard simulated.

Figure 8:
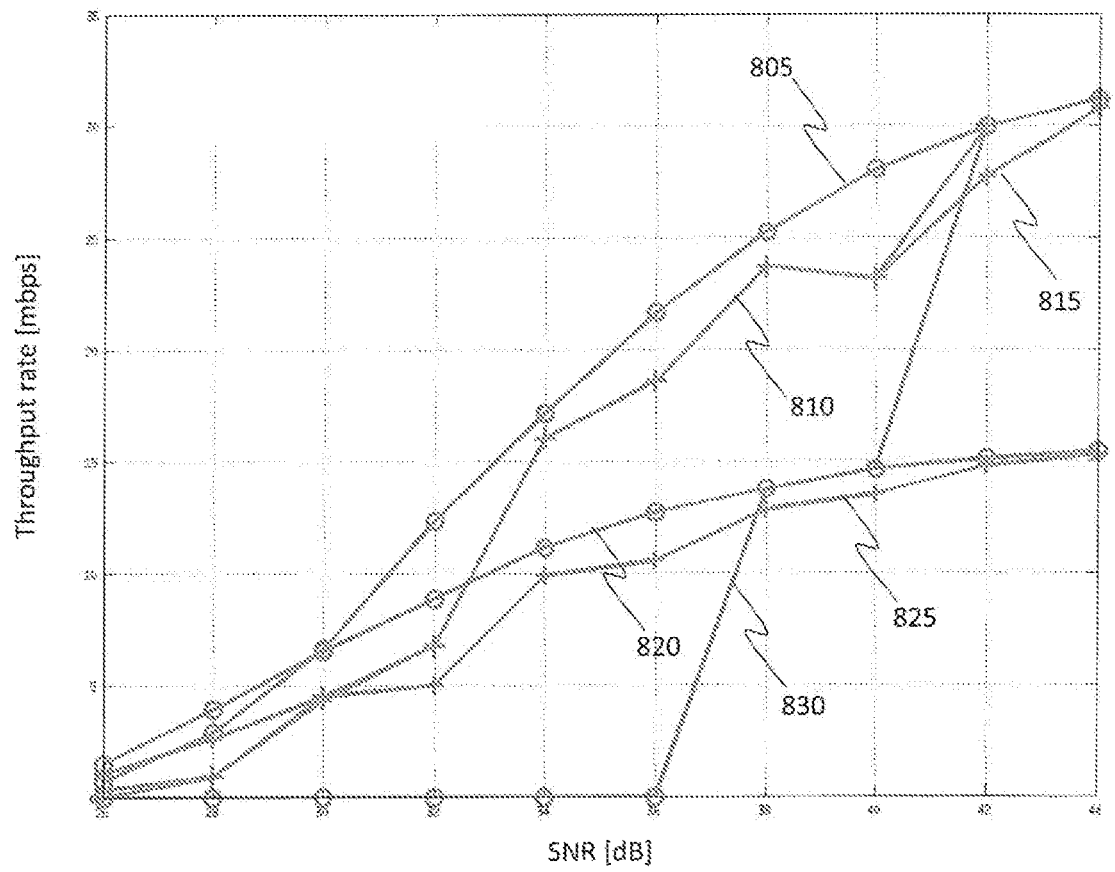
FIG. 8 is a chart depicting throughput rate (megabits per second) as a function of SNR for HARQ-hard.

FIG. 8 shows the throughput rate in megabits per second (Mbps) vs. SNRs for HARQ-hard. When Rate Adaptation (RA) is not enabled, HARQ-hard alone is a relatively mediocre scheme for throughput improvement. However HARQ-hard performed with RA enabled can advantageously provide a gain in systems with QoS requirement to meet a certain target PER (e.g., video or audio applications). It is reasonable to assume that the throughput is zero if the system cannot meet target PER even for the lowest available MCS, in which case the QoS service is interrupted. It is appreciated that the throughput in the system with HARQ-hard can be significantly improved in the low to the medium SNR regimes.

In FIG. 8, curve 805 represents non-HARQ with 16QAM, curve 810 represents HARQ-hard enabled jointly with RA to meet 15% target, curve 815 represents HARQ-hard with 16QAM, curve 820 represents non-HARQ with 4QAM, curve 825 represents HARQ-hard with 4QAM, and curve 830 represents the baseline case for non-HARQ scheme with RA and a 15% target PER.

Figure 9A:
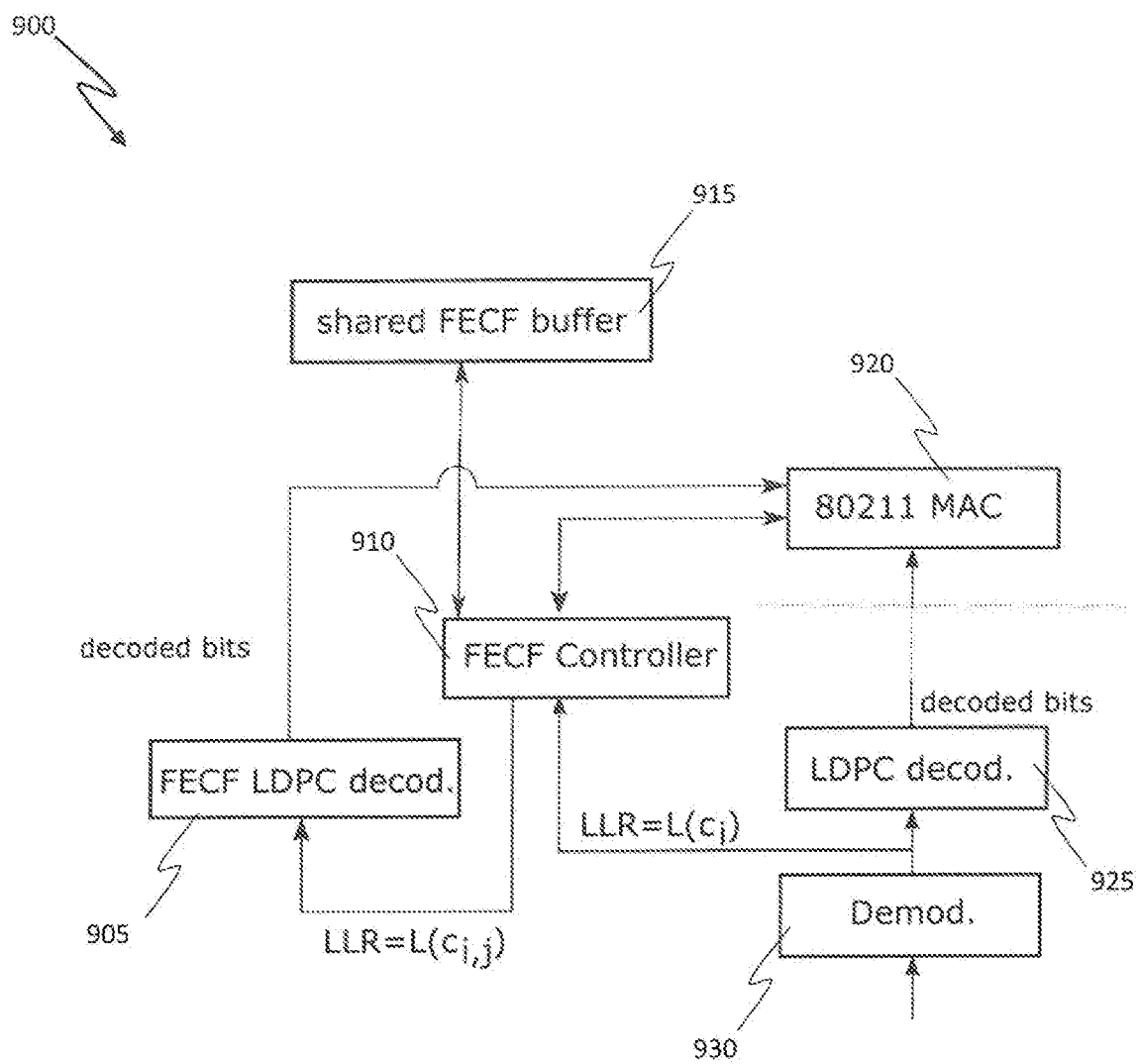
FIG. 9A is a flowchart depicting an exemplary sequence of steps for decoding HARQ transmissions at a HARQ-soft receiver.

FIG. 9A depicts a block diagram of an exemplary apparatus 900 including PHY-MAC protocol interactions for performing a HARQ-soft scheme. HARQ-soft is based on using an additional LDPC decoder denoted as FECF LDPC decoder 905 in FIG. 9A. The FECF LDPC decoder is essentially a regular LDPC decoder with soft inputs that is employed at the 802.11 PHY layer. The MAC layer and the PHY layer cooperate to decode transmissions, to detect errors, to control decoding, and to request retransmission of data. The FECF LDPC decoder 905 uses as inputs the log-likelihood ratios (LLR) of bits stored in FECF buffer 915 which is coupled to FECF controller 910. This controller 910 stores accumulated LLRs of bits obtained after demodulation of data or parity frames.

When the original data frames are received successfully, the FECF controller 910 clears FECF buffer 915. Otherwise the sender stores all LLRs of all bits in FECF buffer 915. 802.11 MAC module 920 determines if a frame is received successfully, and the LLRs of the parity frames and data frames are used by the FECF LDPC decoder 905 to recover bits of any failed data frames. The inputs $L(c_{i,j})$ and decision outputs $Q(c_{i,j})$ of the FECF LDPC represent the i-th bit in the j-th frame. The sequence of output bits $Q(c_{i,j})$ is passed to the 802.11 MAC layer 920. The inputs of FECF LDPC 905 are controlled by the FECF controller 910. In FIG. 9A, the decoder 925 is a regular LDPC decoder used in the 802.11 PHY standard that receives input directly from demodulator 930 and passes decoded bits of data frames to 802.11 MAC layer 935 for FCS error check. The parity frames after demodulator 920 do not need to pass the FCSs because their LLRs can be directly used by the FECF LDPC decoder 905. While the implementation complexity of HARQ-soft is higher than that of HARQ-hard, the introduction of FECF LDPC module 905 can significantly improve throughput since decoding is performed using LLRs of data bits and parity bits.

Figure 9B:
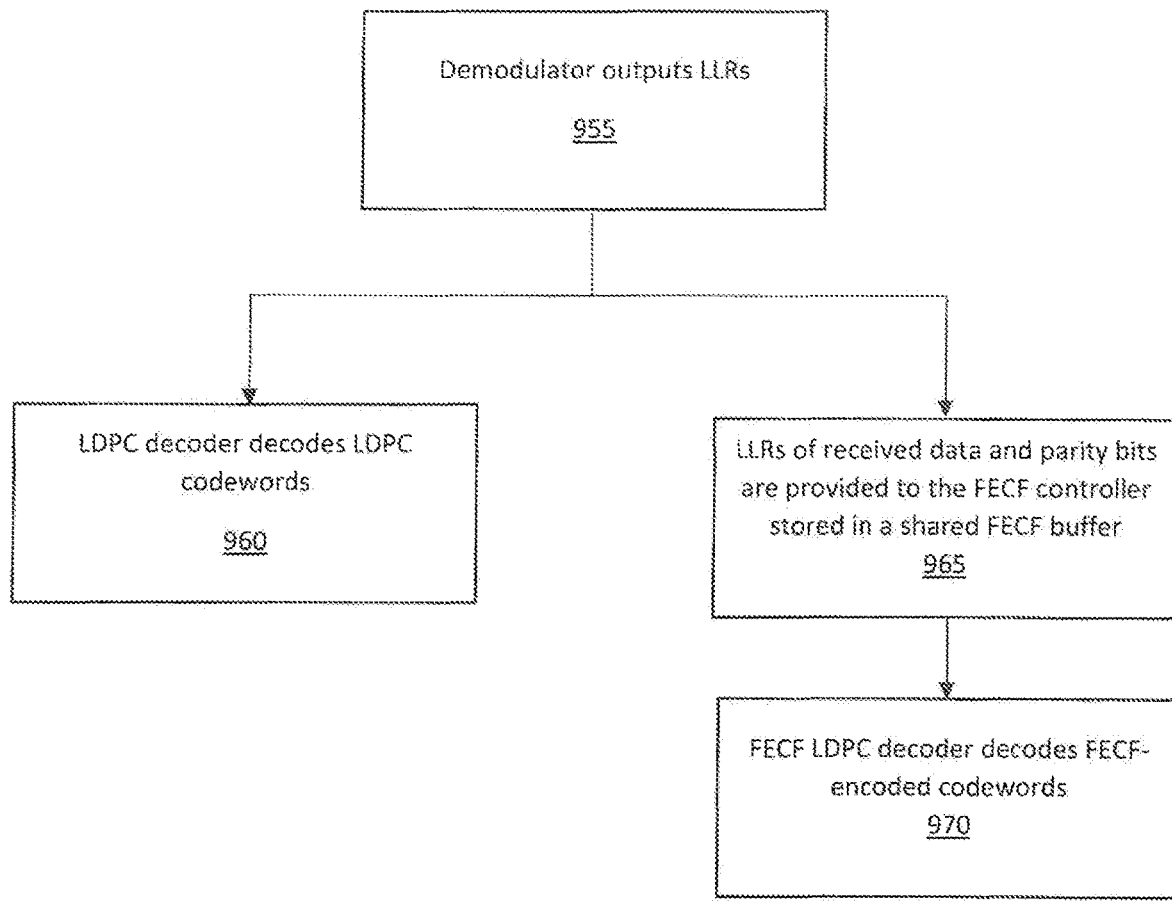
FIG. 9B is a flow chart depicting an exemplary sequence of steps for performing HARQ-soft decoding.

FIG. 9B is a flow diagram depicting an exemplary sequence of steps 950 for performing a decoding procedure using HARQ-soft according to embodiments of the present invention. The method can be performed according to the block diagram depicted in FIG. 9B as follows.

At step 955, a modulated signal is received at a demodulator. After demodulation the soft decision inputs (e.g., the LLRs of received bits) are passed to an LDPC decoder and FECF controller.

At step 960, the LDPC decoder decodes LDPCs codewords of data and parity frames and the decoded bits are passed to the 802.11 MAC layer. After the FCS check, the MAC discards the correctly decoded parity frames and stores correctly received data frames.

At step 965, the LLRs of received data and parity bits are provided to the FECF controller and the LLRs are stored in a shared FECF buffer.

At step 970, the FECF LDPC decoder decodes FECF-encoded codewords. All LLRs of data and parity bits must belong to the same FECF CG. The FECF decoder treats the LLRs of data and parity bits stored in FECF buffer and the LLRs of new received parity bits as an LDPC codeword. Receiving new parity frames adds more non-zero LLRs and therefore improves the decoding success probability. Both FECF decoder and FECF controller are managed by the 802.11 MAC. Note that the FECF decoder uses code puncturing for all the LLRs in a codeword corresponding to parity frames that have not yet been transmitted, e.g., $L(c_{i,j})=0$ for all j parity frames are not yet requested. Code shortening, e.g., $L(c_{i,j}) \gg 0$, is not advised for HARQ-soft due to its poor characteristics.

According to some embodiments, a system model with HARQ-soft uses the following exemplary parameters: the LDPC code with block length of 64,800 bits, and ⅔ and ¾ basis code rates (aka, mother code rate), the MPDU and R-MPDU frames are 500 bytes, the FECF CG length is n=648 frames with k=432 and k=486 data frames for ⅔ and ¾ code rates, respectively. The length of FECF encoding symbols (e.g., u(i,j) and p(i, j) as defined above) is 100 bits. The channel uses an additive white Gaussian noise model (AGWN) with 20 MHz bandwidth with a constellation size of 4QAM with PHY rate of 33 Mbps. The first transmission carries k data frames, and the following transmissions carry parity frames. Up to 3 requests for parity frames are allowed by the receiver to correct failed data frames in the FECF CG. The number of parity frames in each retry is a fixed value of (n−k)/3 frames. By transmitting a limited number of parities, the code is effectively punctured for higher code rate. The LLRs of missing bits are set to zeroes at the input of FECF LDPC decoder 905, e.g., $L(c_{i,j})=0$ for i-th bit in the j-th frames that have not yet been transmitted.

Figure 10:
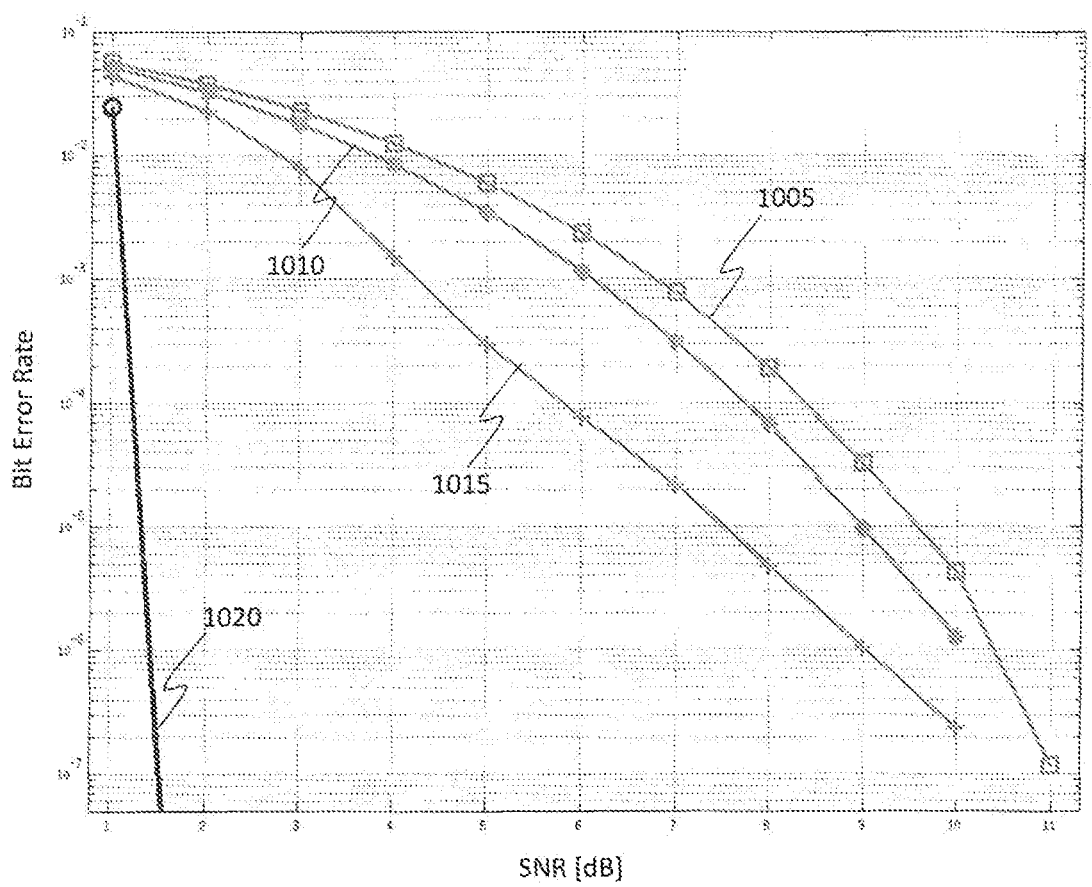
FIG. 10 is a chart depicting the Bit Error Rate (BER) as a function of SNR for HARQ-soft using with a ⅔ basis code rate.
Figure 11:
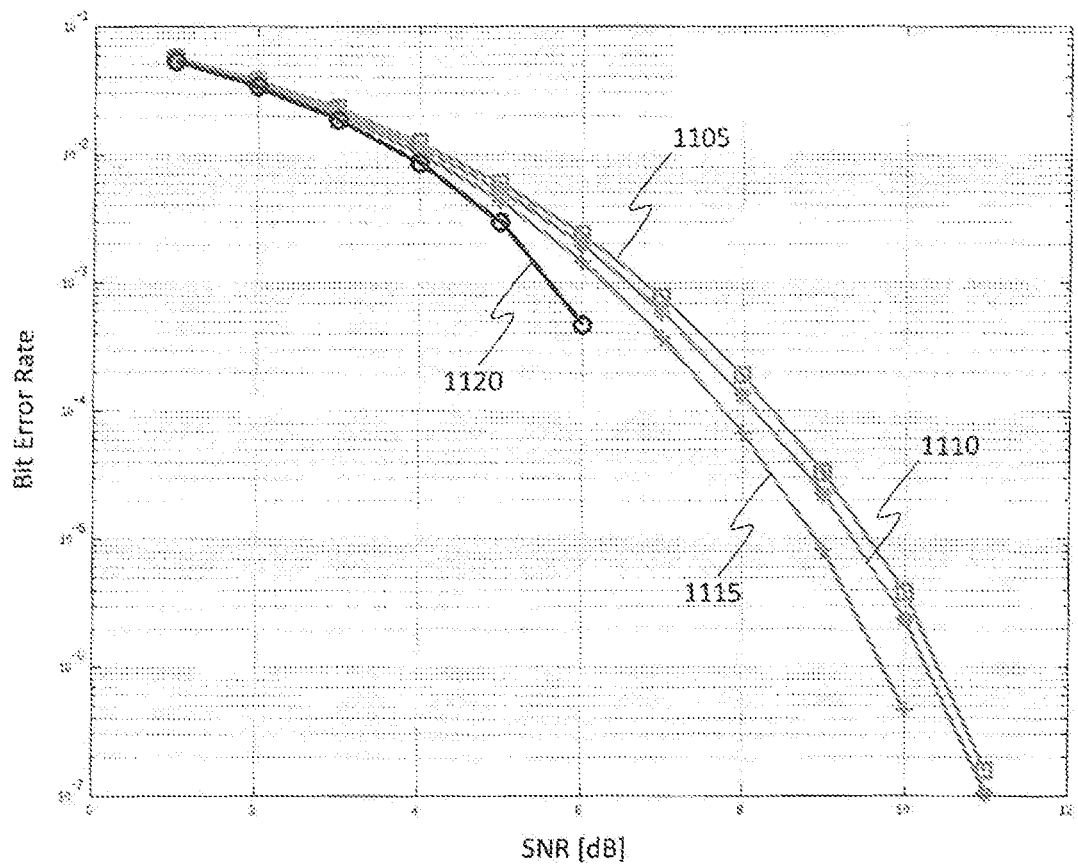
FIG. 11 is a chart depicting the BER as a function of SNR for HARQ-soft with a ¾ basis code rate.

FIG. 10 depicts the BER for HARQ-soft vs SNRs using a ⅔ basis code rate. FIG. 11 depicts the BER for HARQ-soft vs SNR values using a ¾ basis code rate. HARQ-soft can significantly improve BER at medium to high SNR regimes. When all the parities are transmitted (in this example, after retry 3), HARQ-soft can provide almost reliable transmission with near zero BERs. In FIG. 10 and FIG. 11, curves 1005 and 1105 show the baseline results for BER obtained when HARQ is not enabled, curves 1010 and 1110 show the results for BER obtained after the first ⅓ of parity frames are transmitted, curve 1015 and curve 1115 are the BER results for the cases when the sender transmitted ⅔ of parity frames, and curves 1020 and 1120 show the BER results when and all the parity frames are transmitted. As depicted in FIG. 10 and FIG. 11, the lower code rate of ⅔ provides better performance than the higher ¾ code rate due to the greater number of parity frames on retries.

Figure 12:
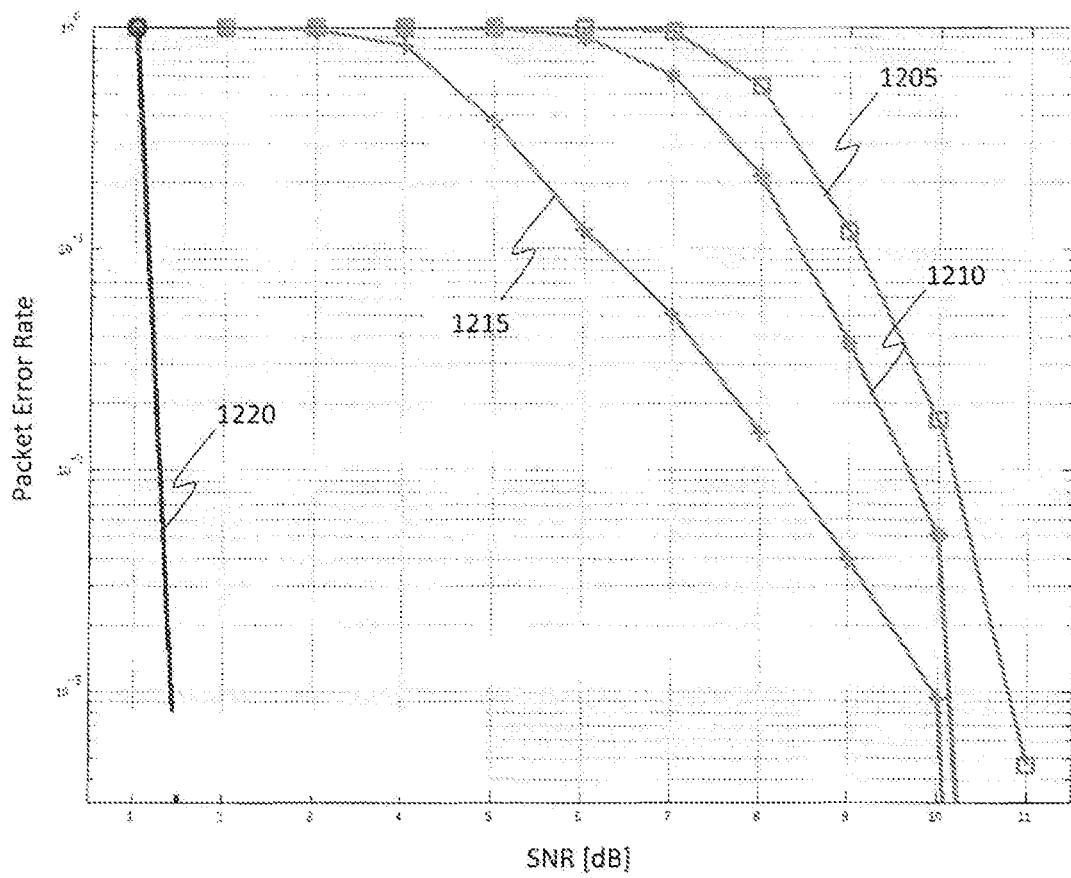
FIG. 12 is a chart depicting the PER as a function of SNR for HARQ-soft using a ⅔ basis code rate.
Figure 13:
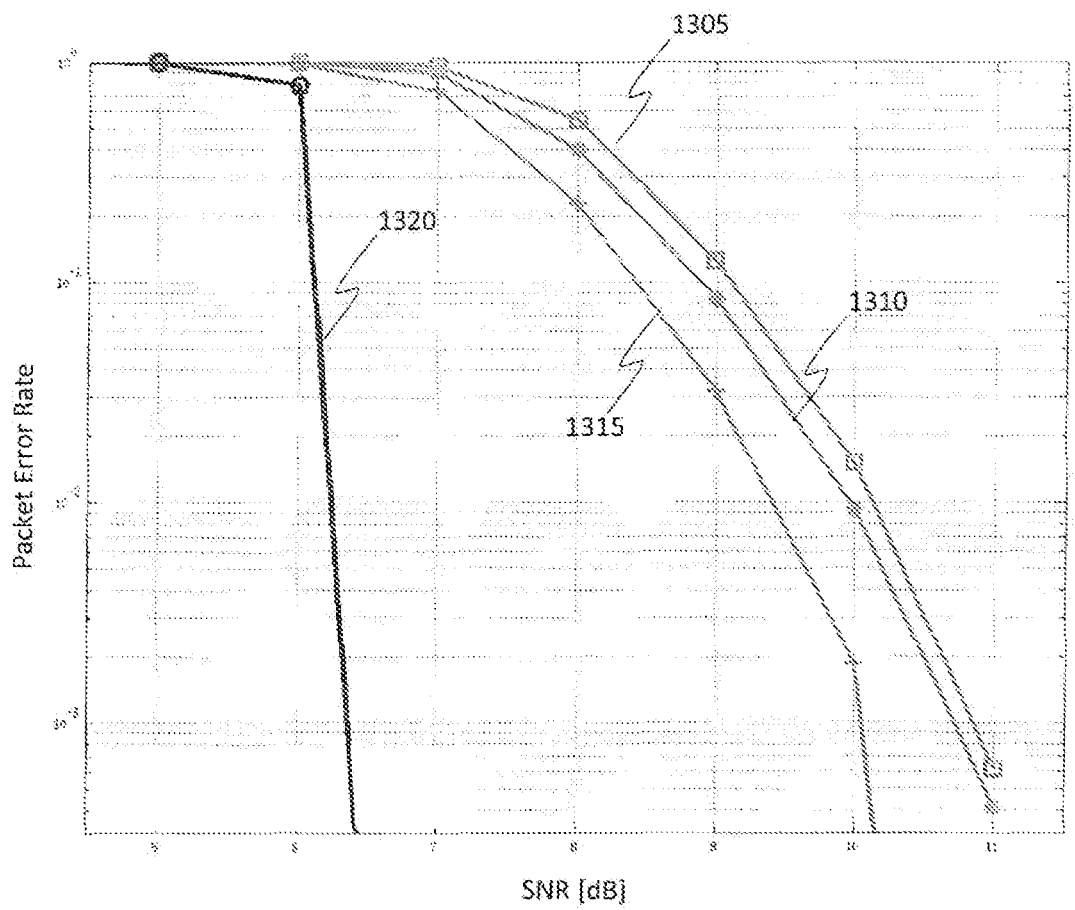
FIG. 13 is a chart depicting the PER as a function of SNR for HARQ-soft using a ¾ basis code rate.

FIG. 12 depicts the PER vs. SNRs using a ⅔ basis code rate and FIG. 13 depicts the PER vs. SNRs using a ¾ basis code rate. When all the parity frames have been transmitted HARQ-soft is expected to provide near reliable packet delivery. Curves 1205 and 1305 serve as the baseline results when HARQ-soft is not enabled, curves 1210 and 1310 represent the results after the first ⅓ of parity frame transmissions, curves 1215 and curve 1315 show the results obtained after ⅔ of the parity frame transmissions, and curves 1220 and 1320 show the results obtained after all the parity frames are transmitted.

Figure 14:
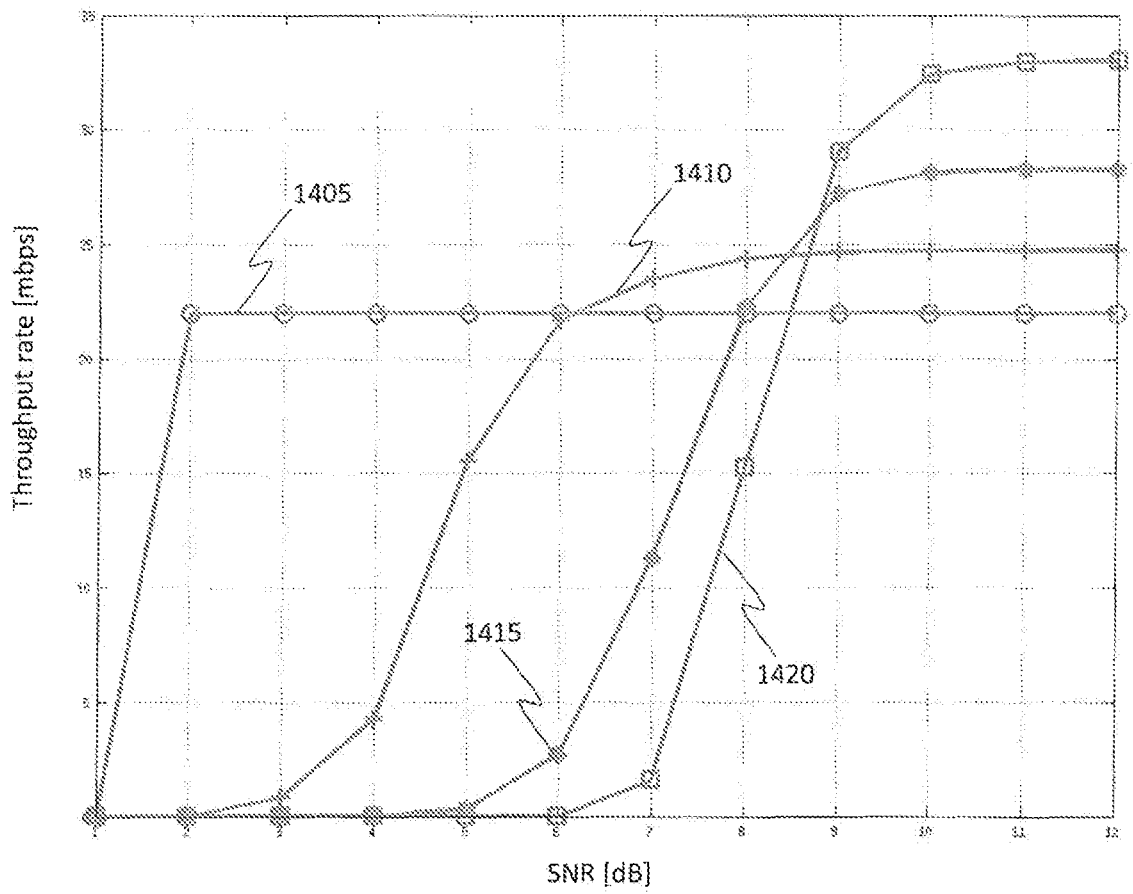
FIG. 14 depicts the throughput rate (megabits per second) as a function of SNR for HARQ-soft using a ⅔ basis code rate of ⅔.
Figure 15:
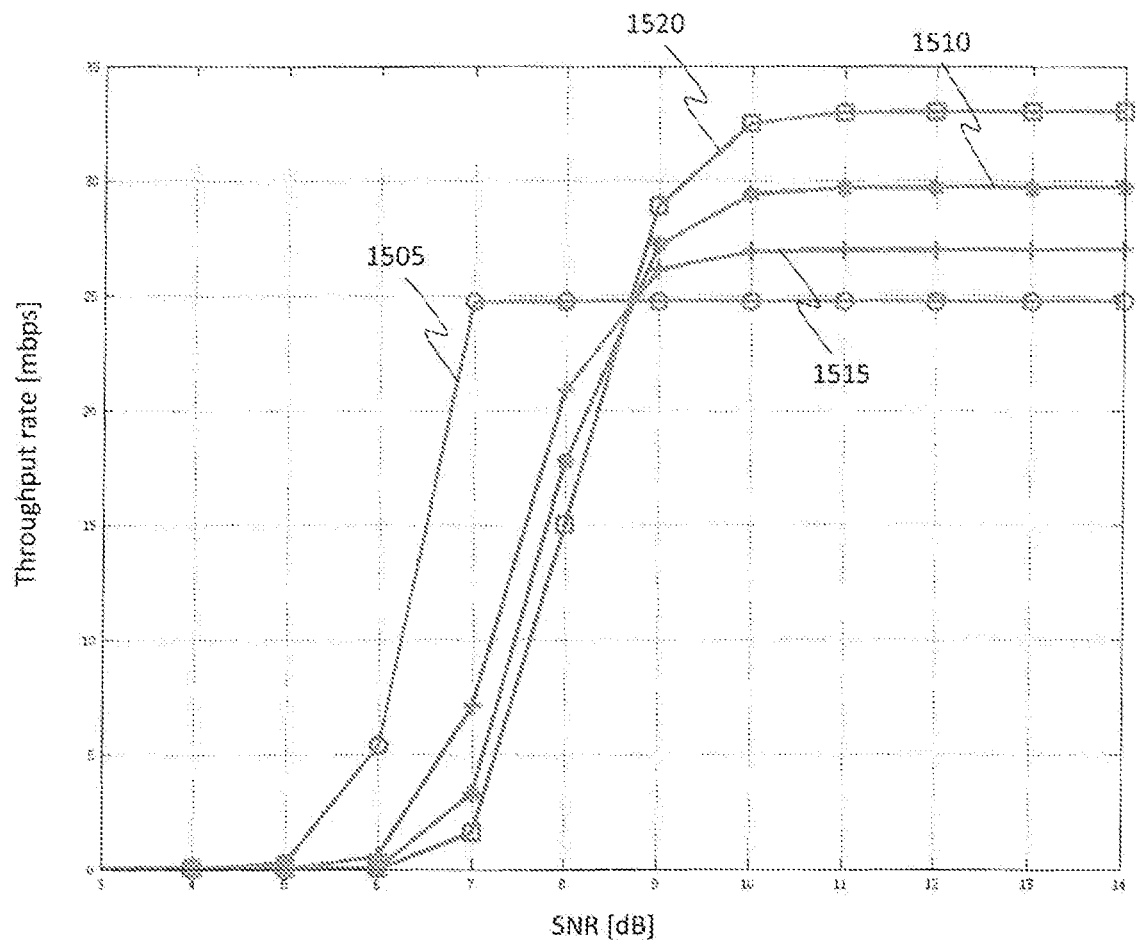
FIG. 15 depicts the throughput rate (megabits per second) as a function of SNR for HARQ-soft with using a ¾ basis code rate.

FIG. 14 depicts the throughput rate (Mbps) vs SNRs using a ⅔ basis code rate and FIG. 15 depicts the throughput rate (Mbps) vs SNRs using a ¾ basis code rate. At the low to medium SNR values, HARQ-soft significantly outperforms the non-HARQ baseline scheme. At high SNR regimes there is no need for error correction, as the added redundancy is essentially a data rate loss, due to very low BERs. Moreover, along with throughput gains, HARQ-soft can also extend the transmission range by up to 5 dB for the ⅔ basis code rate. The throughput gains can be up to 100% despite the rate loss due to the added redundancy. In FIG. 14 and FIG. 15, curves 1405 and 1505 represent the throughput results obtained when HARQ-soft is not enabled, curves 1410 and 1510 show the results after the first ⅓ of parity frame transmissions, curves 1415 and 1515 denote the results obtained after ⅔ of parity frame transmissions, and curves 1420 and 1520 denote the results obtained after all the parity frames are transmitted.

Exemplary Electronic System

Embodiments of the present invention are drawn to electronic systems with wireless capabilities operable to send and/or receive data according to the IEEE 802.11 standard (aka Wi-Fi). The following describes one such exemplary electronic system 1612 depicted in FIG. 16 that can be used as a platform for implementing embodiments of the present invention. For example, System 1612 can be an embedded wireless device, STA or AP.

Figure 16:
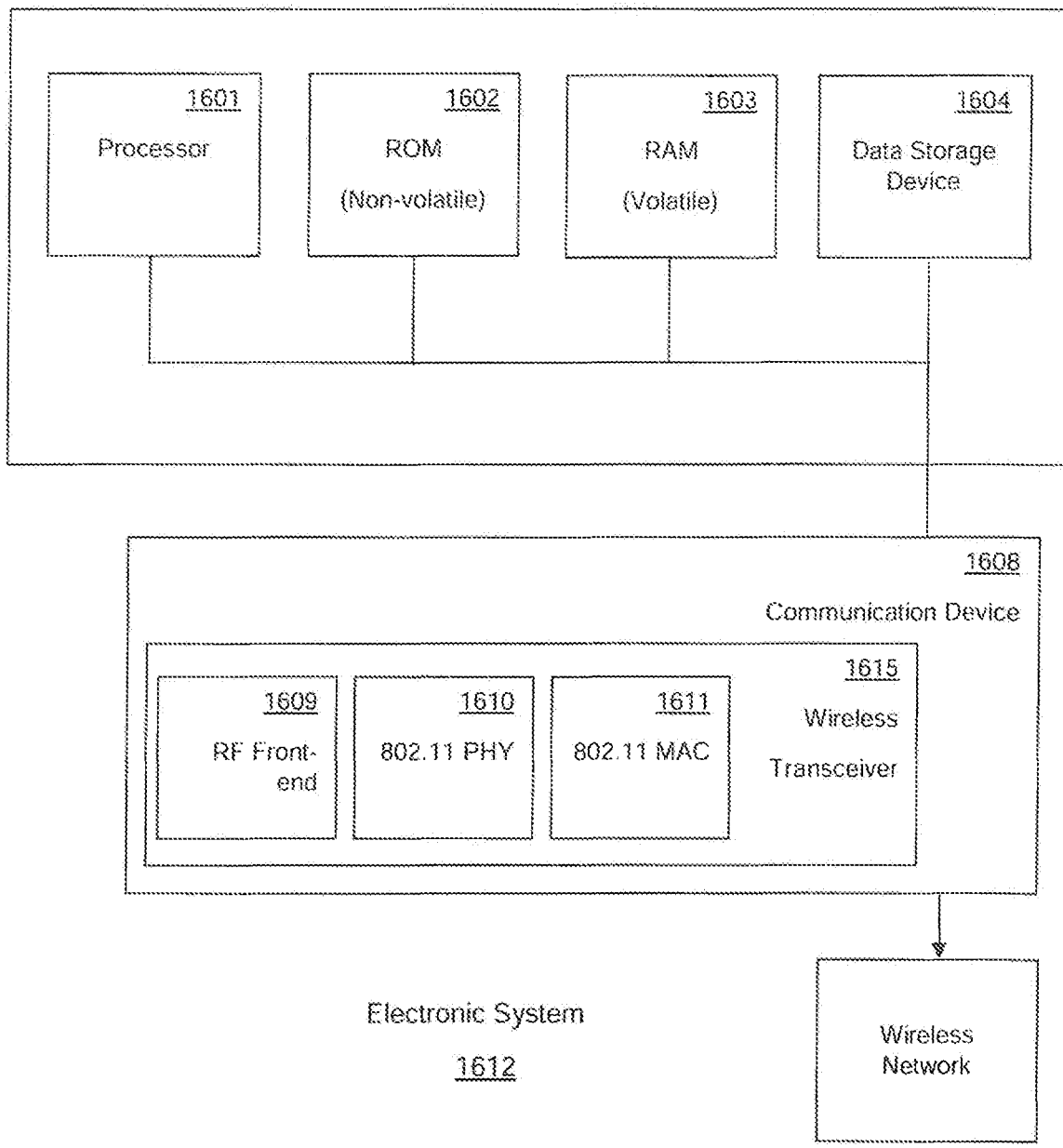
FIG. 16 illustrates a block diagram depicting an exemplary electronic system platform upon which embodiments of the present invention may be implemented.

FIG. 16 shows an electronic system 1612 that includes a communication device 1608, central processing unit 1601, memory blocks 1602 and 1603, storage device 1604, and other peripheral devices such as removable disk drives, flash memory, and/or optical storage devices.

Wireless transceiver 1615 of communication device 1608 enables system 1612 to communicate wirelessly with other 802.11-enabled devices either directly or via network. Typically, the transceiver 1615 consists of three main of functional blocks: RF front end 1609, PHY baseband 1610, and 802.11 MAC 1611. The embodiments of the present invention are to be employed in communication device 1608 at the MAC 1611 and baseband PHY 1610. Specifically, the functionalities of HARQ-hard can be implemented entirely in the MAC 1611 without the need to change any hardware blocks using existing system-on-chip 802.11 MAC architectures. HARQ-hard can be implemented in software, typically in microcode, that runs on a microcontroller or embedded CPU. Some functionalities can be implemented in hardware for acceleration of computations.

According to one embodiment related to HARQ-soft, the 80211 PHY 1610 of wireless transceiver 1615 includes an FECF LDPC decoder, a shared buffer, an FECF controller, an interface between FEC controller and a conventional LDPC, and any other related interfaces for synchronization and clocks. Comparing with HARQ-hard, HARQ-soft requires some minimal changes both in the baseband PHY 1610 and MAC 1611. With either HARQ-soft or HARQ-hard enabled, according to some embodiments, communication device 1608 decodes missing data frames by combining the current and future parity frames with previously stored data and parity frames. It is assumed that a HARQ encoder is also implemented at the sender. For example, using an additional protocol exchange with a receiver, the sender can generate parity frames using an FEFC encoder implemented either in hardware or software. It is to be appreciated that the actions of the FECF encoder at the sender do not differ for HARQ-soft or HARQ-hard.

Some embodiments may be described in the general context of executable instructions, such as program modules, executed by one or more microcontrollers or embedded CPUs. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of wirelessly transmitting information performed by a transmitting device, the method comprising:
  computing a plurality of redundancy frames based on a plurality of data frames, wherein the plurality of data frames comprise data bits;
  transmitting the plurality of data frames to a receiving device;
  transmitting a first set of the plurality of redundancy frames to the receiving device receiving a request from the receiving device to send a second set of the plurality of redundancy frames responsive to a determination that a number of successfully decoded data frames of the plurality of data frames plus a number of successfully decoded redundancy frames of the first set of redundancy frames is less than a predetermined value; and responsive to the receiving the request, transmitting the second set of redundancy frames to the receiving device for decoding wherein the first and second set of redundancy frames are used to decode failed data frames of the plurality of data frames.

2. The method as described in claim 1, further comprising:
subsequent to the transmitting a set of the plurality of redundancy frames, receiving another acknowledgement, from the receiving device, that one or more of the plurality of data frames are missing at the receiving device; and transmitting another set of the plurality of redundancy frames to the receiving device in response to receiving the another acknowledgement, wherein the set and the another set comprise different redundancy frames of the plurality of redundancy frames.

3. The method as described in claim 1 wherein, before the receiving the acknowledgement opportunistically transmitting redundancy frames of the plurality of redundancy frames to the receiving device.

4. The method as described in claim 1 wherein the plurality of redundancy frames are operable to provide information to the receiving deice to reconstruct missing data frames of the plurality of data frames.

5. The method as described in claim 1 wherein each redundancy frame of the plurality of redundancy frames comprises a header that comprises:
an indication that each redundancy frame is a redundancy frame; and
a sequence number to identify a group of data frames to which each redundancy frame pertains.

6. A method of decoding information of a wireless transmission performed by a receiving device, the method comprising:
receiving data frames of a plurality of data frames comprising data bits from a transmitting device;
examining the data frames to determine failed data frames of the plurality of data frames;
receiving a first set of redundancy frames;
determining that a number of successfully decoded data frames of the plurality of data frames Plus a number of successfully decoded redundancy frames of the first set of redundancy frames is less than a predetermined value;
responsive to the determining transmitting a request to the transmitting device to send a second set of redundancy frames associated with the plurality of data frames;
receiving the second set of redundancy frames from the transmitting device; and
decoding failed data frames using the data frames of the plurality of data frames, the first set of redundancy frames, and the second set of redundancy frames.

7. The method of claim 6, wherein each redundancy frame of the redundancy frames comprises a respective header that comprises:
an indication that each redundancy frame is a redundancy frame; and
a sequence number to identify a group of data frames to which each redundancy frame pertains.

8. The method of claim 6, wherein the examining the data frames to determine failed data frames of the plurality of data frames is performed using a decoder operable for decoding density parity-check (LDPC) codes and employing soft, decision input and hard decision output.

9. The method of claim 6, further comprising:
determining failed data frames of the plurality of data frames;
transmitting a request for additional redundancy frames;
receiving the additional redundancy frames from the transmitter; and
decoding failed data frames using the received data frames of the plurality of data frames and the received redundancy frames of the plurality of redundancy frames.

10. An apparatus within a receiving device for decoding information of a wireless transmission from a transmitting device, the apparatus comprising:
a controller coupled to a buffer memory and operable to receive log-likelihood ratios (LLRs) of received data frames and LLRs of received redundancy frames and to store LLRs in the buffer memory;
an 802.11 decoder operable to decode codewords of the received data frames and pass decoded bits of the codewords to an 802.11 MAC interface, wherein the 802.11 decoder is coupled to the controller;
an 802.11 MAC interface coupled to the controller and the 802.11 decoder, wherein the 802.11 MAC interface is operable to provide an indication to the controller identifying failed data frames of the received data frames; and
a redundancy decoder coupled to the controller and the 802.11 MAC interface and operable to receive instructions from the controller to decode bits of the failed data frames using LLRs stored in the buffer memory,
wherein the controller is further operable to clear the buffer memory when all bits of the failed data frames are decoded successfully as indicated by the 802.11 MAC interface.

11. The apparatus of claim 10, wherein the receiving device is operable to request additional redundancy frames based on the indication identifying failed data am-s of the received data frames, and Therein the redundancy decoder is operable to decode bits of the failed data frames using LLRs stored in the buffer memory in combination with LLRs of last received redundancy frames.

12. The apparatus of claim 10, wherein the 802.11 decoder and the redundancy decoder reside at the physical layer of the receiving device.

13. The apparatus of claim 10, wherein the receiving device communicates with a transmitting device in accordance with a version of the IEEE 802.11 standard.

14. The apparatus of claim 10, further comprising a demodulator coupled to the controller and the 802.11 decoder, wherein the demodulator is operable to pass the LLRs of received frames to the controller and to pass a demodulated signal to the 802.11 decoder for decoding the received data frames.

15. The apparatus of claim 10 wherein the 802.11 MAC interface is operable to receive the decoded bits of the codewords from the 802.11 decoder and further operable to discard decoded bits of a redundancy frame and further operable to store decoded bits of a data frame.

16. The apparatus of claim 10 wherein the redundancy decoder is operable to utilize a same redundancy-check matrix for decoding as used by a redundancy encoder of the transmitting device and wherein further the matrix is identified to the receiving device based on MAC protocolling.

17. The apparatus of claim 10 herein the redundancy decoder outputs only decoded bits of failed data frames to the 802.11 MAC interface for failed data frame identification.

* * * * *